United States Patent
Su et al.

(10) Patent No.: US 11,704,433 B2
(45) Date of Patent: Jul. 18, 2023

(54) DYNAMIC PHOTOGRAPH CLASSIFICATION

(71) Applicant: International Business Machines Corporation, Armonk, NY (US)

(72) Inventors: Jun Su, Beijing (CN); Jin Zhang, Beijing (CN); Dong Chen, Beijing (CN); Xi Mei Kong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 17/026,360

(22) Filed: Sep. 21, 2020

(65) Prior Publication Data
US 2022/0092211 A1    Mar. 24, 2022

(51) Int. Cl.
| | |
|---|---|
| *G06F 21/00* | (2013.01) |
| *G06F 21/62* | (2013.01) |
| *G06F 16/55* | (2019.01) |
| *G06N 5/04* | (2023.01) |
| *G06N 20/00* | (2019.01) |
| *H04L 9/40* | (2022.01) |

(52) U.S. Cl.
CPC .......... *G06F 21/6245* (2013.01); *G06F 16/55* (2019.01); *G06N 5/04* (2013.01); *G06N 20/00* (2019.01); *H04L 63/1425* (2013.01)

(58) Field of Classification Search
CPC ....... G06F 21/6245; G06F 16/55; G06N 5/04; G06N 20/00; H04L 63/1425; H04L 63/04
See application file for complete search history.

(56) References Cited

U.S. PATENT DOCUMENTS 8,274,544 B2 *  9/2012  Kurtz ................ H04N 7/147
                                                  348/14.08
9,367,680 B2 *  6/2016  Mahaffey ............ G06F 11/3013
(Continued)

FOREIGN PATENT DOCUMENTS

| CN | 102567941 A | 7/2012 |
|---|---|---|
| CN | 103942469 A | 7/2014 |

(Continued)

OTHER PUBLICATIONS

Li et al., "PhotoSafer: Content-Based and Context-Aware Private Photo Protection for Smartphones", Oct. 2, 2018, 12 pages, <http://arxiv.org/abs/1810.01046v1>.
(Continued)

*Primary Examiner* — Mahfuzur Rahman
(74) *Attorney, Agent, or Firm* — Erika R. DeCosty (57) ABSTRACT

Embodiments of the present invention provide a computer system a computer program product, and a method that comprises identifying privacy data within received data by identifying markers that are indicative of privacy data within the received data; generating a respective classification of an object within the identified privacy data; assigning values to the generated respective classification of the object based on a perceived threat level associated with the identified privacy data; and in response to determining that the assigned value of the received data triggers an alert associated with a predetermined threshold for privacy, automatically preventing distribution of the received data from a computing device to another computing device.

20 Claims, 6 Drawing Sheets

(56) References Cited

U.S. PATENT DOCUMENTS

| | | | | |
|---|---|---|---|---|
| 10,560,579 | B1* | 2/2020 | Wu | H04M 3/5233 |
| 2012/0284105 | A1* | 11/2012 | Li | G06Q 30/02 |
| | | | | 705/14.23 |
| 2014/0068706 | A1 | 3/2014 | Aissi | |
| 2015/0033305 | A1* | 1/2015 | Shear | G06F 21/6218 |
| | | | | 726/11 |
| 2016/0099963 | A1* | 4/2016 | Mahaffey | G06F 21/554 |
| | | | | 726/25 |
| 2018/0027006 | A1* | 1/2018 | Zimmermann | G06F 21/6218 |
| | | | | 726/11 |
| 2020/0128372 | A1* | 4/2020 | Zhang | H04W 4/44 |
| 2021/0075794 | A1* | 3/2021 | Gazit | H04L 63/1408 |

FOREIGN PATENT DOCUMENTS

| | | |
|---|---|---|
| CN | 104462900 A | 3/2015 |
| CN | 105354509 A | 3/2018 |
| WO | 2019071754 A1 | 4/2019 |

OTHER PUBLICATIONS

Authors et al.: Disclosed Anonymously, "Securing private images on user devices", An IP.com Prior Art Database Technical Disclosure, IP.com No. IPCOM000256726D, IP.com Electronic Publication Date: Dec. 26, 2018, 13 pages.

\* cited by examiner

Data structure

Table 1 – impact statistics

| SN | Total Components | Positive Influence Components | Negative Impact Components | Single (G/N/B) |
|---|---|---|---|---|
| 1 | 13 | 3 | 0 | G |
| n | ...... | | | |

If NIC > PIC
  Single (G/N/B)=B
If NIC < PIC
  Single (G/N/B)=G
Else
  Single (G/N/B)=N Table 2 – Personal affairs / fields / information extraction

| SN | Type | Do/Status | Grouping as subject |
|---|---|---|---|
| 1 | Personal affairs | playing badminton | my classmates |
| 2 | Personal field | lying on the bed | a person |
| 3 | Personal field | lying on the bed | a person |
| 4 | Personal information | Name Birth Numbers | ID Card |
| n | ...... | | |

Table 3 – Impact statistics $$Sum\_1 = \frac{MC}{TE} \quad Sum\_2 = \frac{TE}{\Sigma TE}$$

According to the proportion of positive and negative components, the influence degree of corresponding information in public cognition is obtained. According to the training quantity, the higher the proportion is, the higher the reliability of the result is.

| Type | Do/Status | Grouping as subject | Main Comp. | Total Entry | Sum_1 | Sum_2 |
|---|---|---|---|---|---|---|
| 1 | Personal affairs | playing badminton | my classmates | 98 | 132 | 74% | 0.0264 |
| | ...... | | | | | | |
| 2 | Personal field | lying on the bed | a person | 523 | 574 | 91% | 0.1148 |
| | ...... | | | | | | |
| 3 | Personal information | Name Birth Numbers | ID Card | 652 | 913 | 71% | 0.1826 |
| | ...... | | | | | | |

DYNAMIC PHOTOGRAPH CLASSIFICATION

BACKGROUND

The present invention relates generally to the field of data privacy, and specifically photograph classification.

Photography is the art, application and practice of creating durable images by recording light or electromagnetic radiation, either electronically by means of an image sensor, or chemically by means of a light sensitive material such as photographic film. It is employed in many fields of science, manufacturing (e.g., photolithography), and business, as well as its more direct uses for art, film, and video production, recreational purposes, hobby, and mass communication. Typically, a lens is used to focus the light reflected or emitted from objects into a real image on the light-sensitive surface inside a camera during a timed exposure. With an electronic image sensor, this produces an electrical charge at each pixel, which is electronically processed and stored in a digital image file for subsequent display or processing. The result with photographic emulsion is an invisible latent image, which is later chemically developed into a visible image, either negative or positive depending on the purpose of the photographic material and the method of processing. A negative image on film is traditionally used to photographically create a positive image on paper base, known as a print, either by using an enlarger or by contract printing.

Data privacy is the relationship between the collection and dissemination of data, technology, the public expectation of privacy, legal and political issues surrounding them. It is also known as information privacy or data protection. Data privacy is challenging since it attempts to use data while protecting an individual's privacy references and personally identifiable information. The fields of computer security, data security, and information security all design and use software, hardware, and human resources to address this issue.

SUMMARY

Embodiments of the present invention provide a computer system a computer program product, and a method that comprises identifying privacy data within received data by identifying markers that are indicative of privacy data within the received data; generating a respective classification of an object within the identified privacy data; assigning values to the generated respective classification of the object based on a perceived threat level associated with the identified privacy data; and in response to determining that the assigned value of the received data triggers an alert associated with a predetermined threshold for privacy, automatically preventing distribution of the received data from a computing device to another computing device.

DETAILED DESCRIPTION

Embodiments of the present invention recognize the need for an improvement to current data privacy systems by providing an adaptive security program that protects personal data. Embodiments of the present invention provide systems, methods, and computer program products for an improvement to existing data privacy technologies. Currently, data privacy technology requires manual operation of the technology to monitor and update information being accessed by the technology. Generally, data privacy technology stores photos, videos, and other data in a secure location, but requires manual input from an operator to access the stored information, perform functions with the stored data, and monitor a status of the stored data. However, embodiments of the present invention provide an improvement to current data privacy technology using artificial intelligence algorithms and machine learning algorithms to generate an adaptive data classification program that removes the requirement of manual input of outside influence, such as an operator. Embodiments of the present invention improves current data privacy technologies using an adaptive data classification program that receives data, analyzes data using multiple modules, determines whether the data meets or exceeds a predetermined classification threshold, and in response to the analyzed data meeting the threshold, prevents the analyzed data from being accessed, displayed, or transmitted to dynamically remove a user input requirement to prevent private data becoming public.

Figure 1:
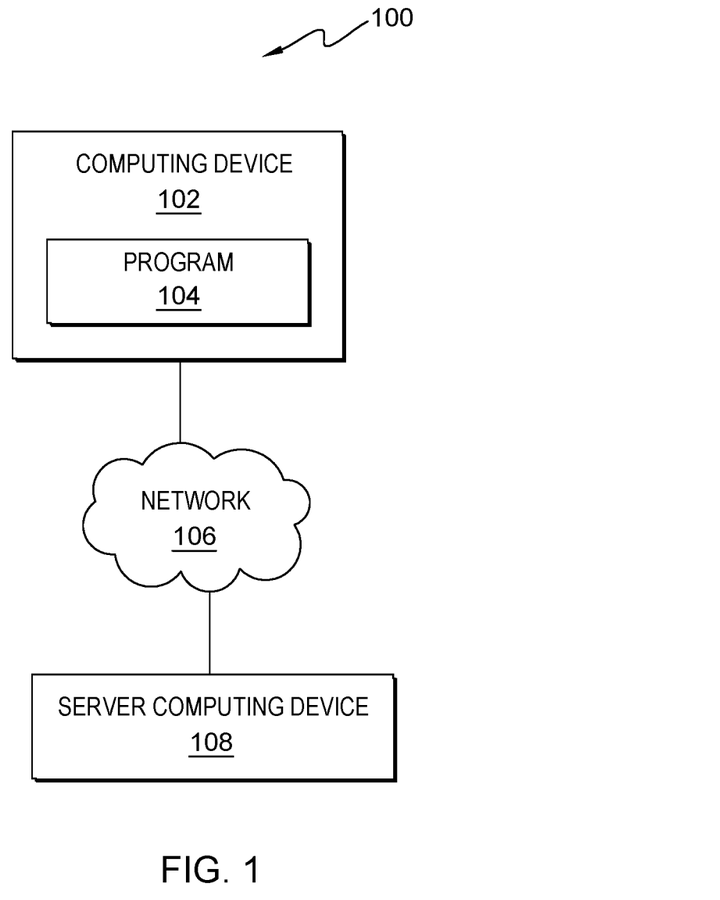
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 6.

The computing device 102 may include a program 104. The program 104 may be a stand-alone program on the computing device 102. In another embodiment, the program 104 may be stored on a server computing device 108. Embodiments of the invention enable the program 104 to help a user identify private data by detailing the identified private data that is within a predetermined public awareness. In this embodiment, the program 104 combines the identified private data with the user specific preferences associated with private data, removing the need for manual input. In this embodiment, the program 104 generates an influence chart of public cognition based on received open data. In response to generating the influence chart, the program 104 generates a user specific privacy map based on the user's characteristics by extracting data from historical data associated with the user's personal database. In this embodiment, the program 104 performs operations based on filtered information and according to the user specific privacy map.

In this embodiment, privacy is divided into three categories consisting of personal affairs, personal information, and personal field of a natural person. The first dimension of privacy is personal affairs. Personal affairs are the fundamentally different from public affairs, group affairs, and unit affairs. Personal affairs are embodied in the privacy of the outside world in a concrete and tangible form and take specific individuals as the main body of activities. For example, communications between friend exchanges, husband and wife life, etc., are considered personal affairs. Picture content also falls within the personal affair privacy dimension. In this embodiment, the program 104 generates a short description of the picture content, including but not limited to the main object, time, place, location, event, and activity descriptions of the picture.

The second dimension of privacy is personal information. Personal information refers to the information, materials, data, etc., that specific individuals do not want to disclose. This personal information is considered abstract and intangible privacy. For example, health records or tax records are considered personal information. Picture object also falls within the personal information privacy dimension. In this embodiment, the program 104 identifies all attached objects within the picture and uses these attached objects as reference elements of the user's personalized privacy information.

The third and final dimension of privacy is personal field privacy. Personal field refers to the scope of personal of personal privacy. For example, hidden parts of the body, diary contents, and communication secrets are considered personal field. User awareness also falls within the personal field privacy dimension. In this embodiment, the program 104 analyzes the personal privacy information of a user according to the user's operation history of the picture.

In this embodiment, the program 104 receives information from a database or a device, reads the information, and stores the information as data on the computing device 102. In this embodiment, the program 104 performs an intelligent analysis on the received information using a training module (not shown), an information adjustment module (not shown), and a data generation and update module (not shown). In this embodiment, the program 104 analyzes the received data by training data using a training module, adjusting the received data based on an application of trained data using an information adjustment module, and dynamically generating a model and updating the generated model using a data generation and update module. In this embodiment, the program 104 analyzes the received data by using the training module to identify, determine, and predict the effect the received data would have on a user. In this embodiment, the program 104 uses the training module of the analysis of the received data to dynamically adapt to subsequent received data. In this embodiment, the program 104 analyzes the received data by using the information adjustment module to extract a consensus operation; adjust the operation based on trust results, sharing history of the user, and the results of the training module; and continuously update a user's privacy information or objects that define user personalization. In this embodiment, the program 104 generates a classification for the analyzed data based on the analysis using the modules. In this embodiment, the program 104 determines whether the generated classification meets or exceeds a predetermined classification threshold. In this embodiment and in response to the generated classification meeting or exceeding the predetermined threshold, the program 104 automatically prevents the analyzed data from being dispersed.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106.

Figure 2:
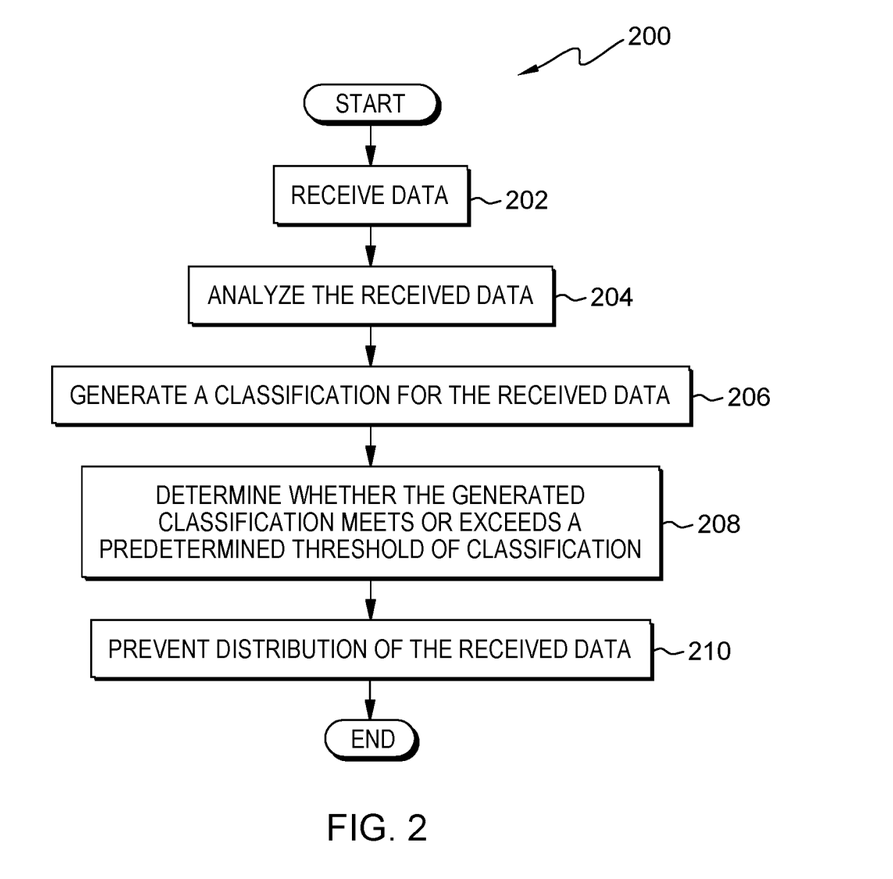
FIG. 2 is a flowchart illustrating operational steps for identifying a classification of data based on privacy of the data, in accordance with at least one embodiment of the present invention.

FIG. 2 is a flowchart 200 illustrating operational steps for identifying a classification of data based on privacy of the data, in accordance with at least one embodiment of the present invention.

In step 202, the program 104 receives data. In this embodiment, the program 104 receives information from a database or a device, reads the information, and stores the information as data on the computing device 102. For example, the program 104 receives information in the form of a picture, reads the picture as code, and stores the code associated to the picture on a smart phone.

In step 204, the program 104 analyzes the received data. In this embodiment, the program 104 analyzes the received data using multiple modules. In this embodiment, the program 104 analyzes the received data using the training module, the information adjustment module, and the data generation and update module. In this embodiment, the program 104 analyzes the received data using the training module by identifying multiple information gathering factors within the received data and placing portions or sub-sets of data within the received data associated with the multiple factors into ascending levels of privacy based on the analysis of the received data using the multiple modules. In this embodiment, the program 104 identifies the date and location of the received data and places this data into level 1, which is the lowest (e.g., basic) level. A level is defined as a classification of data based on complexity and commonality of the data being identified. In this embodiment, the levels become more active and complex as they ascend. In this embodiment, the program 104 identifies people and things within the received data and places this data into level 2. In this embodiment, the level 2 identifies the who and what within the received data.

In this embodiment, the program 104 can then compile the identified people and things placed in level 2 into detailed groups and places these detailed groups into level 3. In this embodiment, the program 104 complies the identified people and things by identifying the people or things in the received data, extracting details associated with the identified people or things in the received data, wherein the extracted details are similarities and differences, and organizing the identified people or things based on the extracted details. In this embodiment, the program 104 the organizes the identified people or things based on extracted details by grouping the extracted details as subjects. For example, the program 104 identifies people in the received data and groups the people as two persons. In this embodiment, extracted details are sub-sets of the received data that contain information associated with the identified people and things, and the program 104 uses the extracted details to obtain additional information on the identified people and things. In another example, the program 104 identifies things in the received data and groups the thing as animals.

In this embodiment, the program 104 predicts an action associated with the grouped subjects and places the action into level 4. In this embodiment, the program 104 predicts an action associated with the group by identifying the grouped subject, retrieving additional information associated with the grouped subject and extracted details from a server computing device 108, and determining the action associated with the grouped subject based on the identification and retrieval of additional information associated with the grouped subject. In this embodiment, an action is defined as the process of doing a thing. Examples of actions are behaviors, movements, and statuses. In this embodiment, level 4 houses the action or status of the received data. For example, the program 104 predicts the action of the two people, or the grouped subject, as golfing by identifying the group, retrieving additional information on the golf clubs and golf cart within the received information to determine the action the group is performing is golf.

In another embodiment, the program 104 may use at least one module to analyze the received data. In another embodiment, the program 104 may use at least two modules to analyze the received data. For example, the program 104 analyzes the data with a training module to train the program 104 for future received data; the program 104 analyzes the data with the information adjustment model to optimize and modify the received data based on the analysis; and the program 104 analyzes the data with a generation and update module to continually update the received data and generates a classification associated with the received data based on the analysis of the other modules.

In another embodiment, the program 104 identifies privacy data by identifying markers that indicative of privacy data within the received data.

In step 206, the program 104 generates a classification for the received data. In this embodiment, the program 104 generates a classification for the received data based on the analysis using the modules. In this embodiment, the program 104 defines the classification as a numerical value to be placed on a scale. In this embodiment, the program 104 assigns a value for factors within the analysis of the received data and quantifies each factor of the modules to calculate an overall value associated with the received data, and this overall value is the classification. In this embodiment, the program 104 identifies values associated with factors throughout the analysis using multiple modules, calculating a score based on the identified value, and generating an overall score by aggregating calculated scores across the multiple modules during the analysis of the received data using machine learning algorithms and artificial intelligence algorithms. In this embodiment, the program 104 assigns values to the generated respective classification of the object based on a perceived threat level associated with an identified privacy data.

In step 208, the program 104 determines that the generated classification meets or exceeds a predetermined threshold of classification. In this embodiment, the program 104 determines that the generated classification meets or exceeds the predetermine threshold of classification by comparing the generated classification value to the predetermine threshold value. In this embodiment, the program 104 defines the predetermined threshold value as a benchmark privacy value, which if the meet or exceeded the received data should be kept private and unable to be transmitted. In this embodiment, the program 104 defines the predetermined threshold of classification as a measurement of personal privacy. There are multiple factors that are taken into account when establishing the predetermined threshold. For example, the program 104 generates a classification value for the received data of the photograph as a value of 8, and the predetermined threshold value was 7. Therefore, the program 104 determines that the generated classification of the received data exceeds the predetermined threshold value of 7.

In another embodiment, the program 104 determines that the generated classification does not meet or exceed the predetermined threshold of classification. In this embodiment and in response to determining that the generated classification does not meet or exceed the predetermined threshold of classification, the program 104 allows the received data to be distributed to external computing devices and server computing devices 108 via the network 106.

In step 210, the program 104 prevents distribution of the received data. In this embodiment and in response to the generated classification exceeding the predetermined threshold of classification, the program 104 prevents distribution of the received data. In this embodiment, the program 104 prevents distribution of the received input by processing a correlation between the received data and security feature associated with the user and actively monitors transmissions of the computing device 102 to ensure that the received data is prevented from distribution. In another embodiment and in response to the generated classification failing to meet or exceed the predetermined threshold of classification, the program 104 distributes the received data upon request. In another embodiment and in response to the generated classification exceeding the predetermined threshold, the program 104 transmits a notification to the computing device 102 detailing that the received input exceeded the predetermined threshold of classification. In another embodiment, the program 104 may receive manual input to override the program 104 automatically preventing the distribution of the received data. In another embodiment and in response to the assigned value of the received data triggering an alert associated with the predetermined threshold of privacy, the program 104 automatically prevents the distribution of the received data from the computing device 102 to another computing device.

Figure 3:
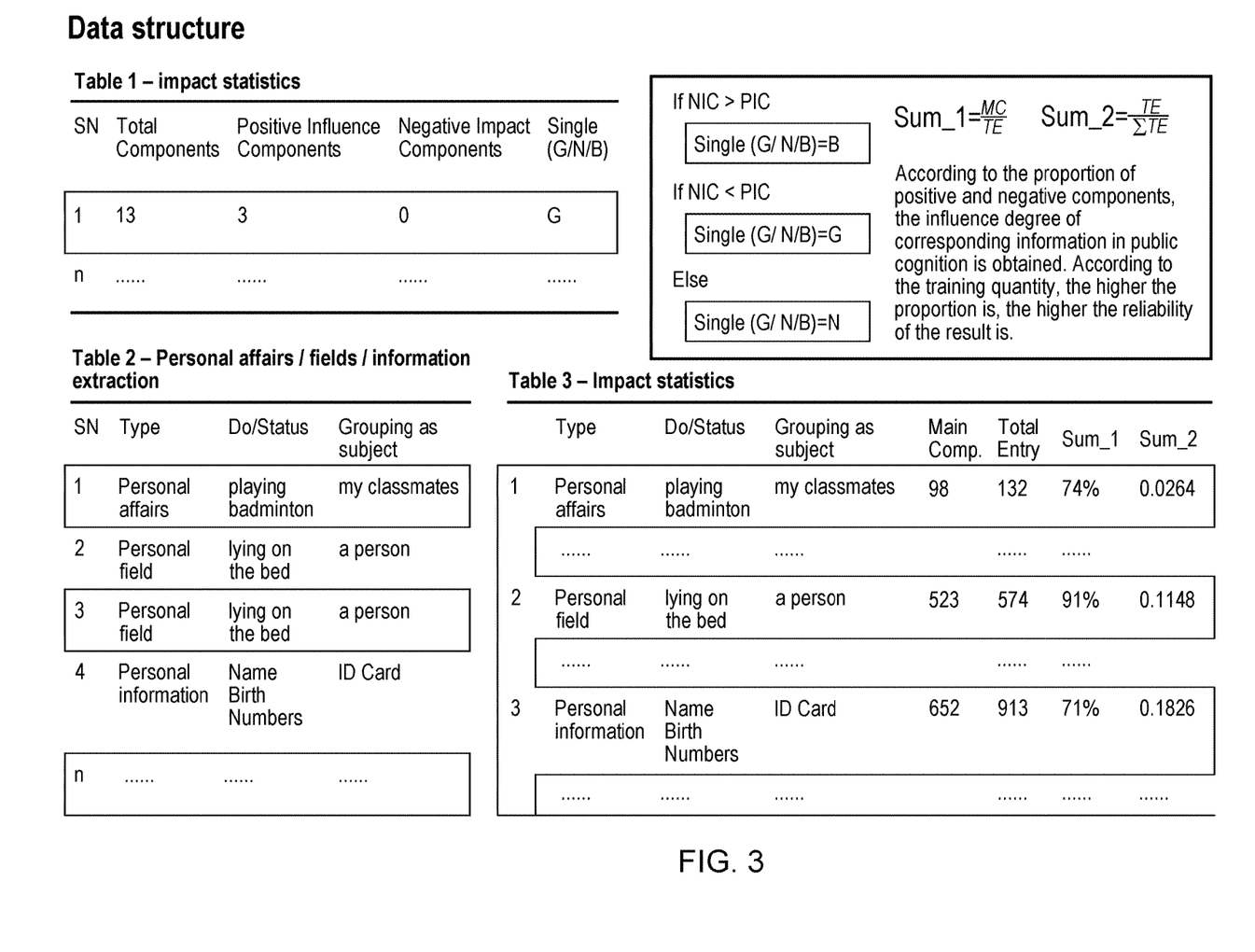
FIG. 3 are exemplary diagrams illustrating statistics of the analysis of the received input, in accordance with at least one embodiment of the present invention.

FIG. 3, Table 1 is an exemplary diagram illustrating impact statistics of the received data, in accordance with at least one embodiment of the present invention. In Table 1, the program 104 identifies the total number of components, identifies the number of positive impact components within the total number of components, identifies the number of negative impact components within the total number of components, and determines a single (G/N/B) based on the ratio of positive impact components and negative impact components. A single (G/N/B) is defined a combination of elements of a router such as the speed, range and compatibility with older devices associated with a device. In this embodiment and in response to identifying a larger amount of negative impact components within the total number of components, the program 104 determines that the Single (G/N/B)=B. In this embodiment and in response to identifying a larger amount of positive impact components within the total number of components, the program 104 determines that the Single (G/N/B)=G. For example, the program 104 identifies 13 total components identified, 3 positive influence components, and 0 negative impact components. In this embodiment and in response to identifying an equal amount of positive impact components and negative impact components within the total number of components, the program 104 determines that the Single (G/N/B)=N.

FIG. 3, Table 2 is an exemplary diagram illustrating the personal affairs, personal fields, and information extraction information associated with the received data, in accordance with at least one embodiment of the present invention. In Table 2, the program 104 displays the multiple levels that the received data was placed into by the program 104 in response to the analysis using the training module on the received data. In this embodiment, the program 104 displays the type of received data. For example, the program 104 displays received data as personal affairs, personal field, and personal information. In this embodiment, the program 104 displays the action, level 4, being performed in the received data. For example, the program 104 displays the action as playing badminton, lying on the bed, and biographical data associated with a user. In this embodiment, the program 104 displays the grouped subjects, level 3, of the received data. For example, the program 104 displays the grouped subject as a user's classmates, a person, and an identification card.

FIG. 3, Table 3 is an expanded exemplary diagram illustrating impact statistics of the received data in accordance with at least one embodiment of the present invention. In this embodiment, the program 104 displays the same information as Table 2 but also displays a number of main components ("MC") within the received data and a total number of entries ("TE") of received data. Furthermore, the program 104 displays a Sum_1 and a Sum_2. In this embodiment, the program 104 obtains the influence degree of the received information according to the ration of positive and negative components. In this embodiment, the higher the ratio then the higher the reliability of the result based on the analysis performed by the program 104 using the training module on the received data. In this embodiment, the program 104 calculates the sums by utilizing the following formulas:

$$Sum_1 = \frac{MC}{TE} \quad (1)$$

$$Sum_2 = \frac{TE}{\sum TE} \quad (2)$$

With respect to equations (1) and (2), "MC" represents the number of main components located with the received data, and "TE" represents the number of total entries of the received input. For example, the program 104 identifies 98 main components, and 132 total entries. Thus, the program 104 calculates Sum_1 by dividing 98 by 132, which equals 0.74. The program 104 calculates Sum_2 by dividing 132 by the summation of 132, which equals 0.0264.

Figure 4:
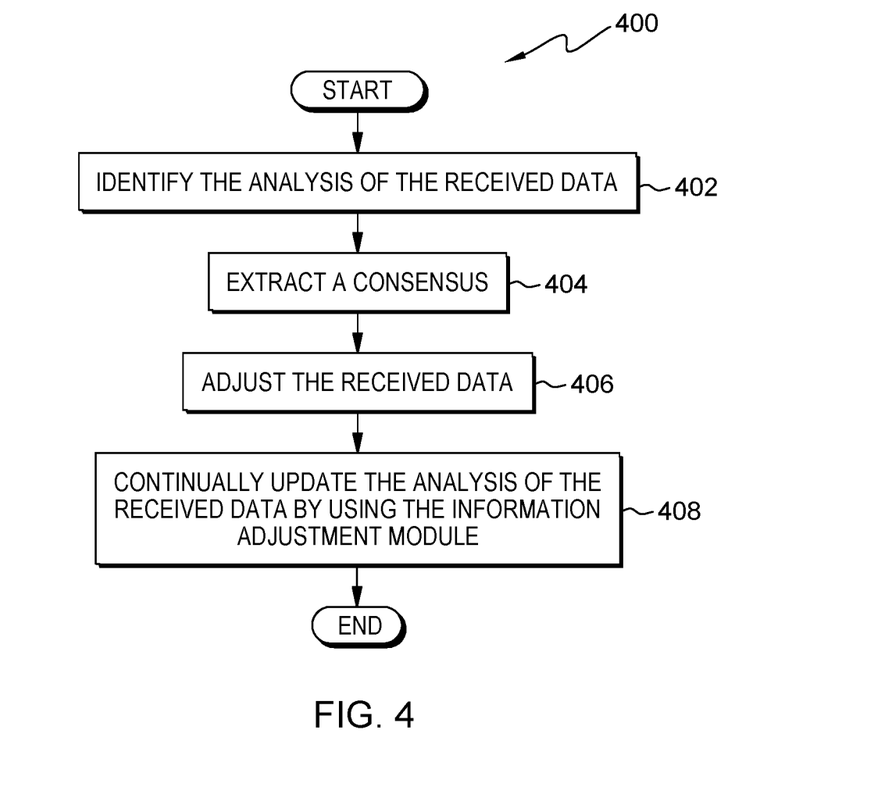
FIG. 4 is a flowchart illustrating the operational steps of analyzing the received data using the information adjustment module, in accordance with at least one embodiment of the present invention.

FIG. 4 is a flowchart 400 illustrating the operational steps of analyzing the received data using the information adjustment module, in accordance with at least one embodiment of the present invention. In this embodiment, the program 104 analyzes the received input by performing multiple operations on the received input. In another embodiment, the program 104 analyzes the received data using the information adjustment module in response to the program 104 analyzing the received data using the training module.

In step 402, the program 104 identifies the analysis of the received data based on the training module. In this embodiment, the program 104 identifies the multiple levels of information associated with the received data that was formulated and complied using the training module. For example, the program 104 identifies people, groups the people as two people, and determines that the two people are golfing.

In step 404, the program 104 extracts a consensus. In this embodiment, the program 104 extracts a consensus from the received input by examining the received data using a machine learning algorithm, narrowing the examination of the received data to a predetermined area of inquiry by examining data with a predetermined rate of privacy, retrieving additional information associated with the examined data, and compiling the narrowed data and the retrieved additional information by generating a database or data storage space and storing the narrowed data and the retrieved additional information within the generated database. The program 104 extracts a consensus by comparing the compiled data to an external data source's determination of privacy. An external data source's determination of privacy is defined as the public's general opinion of the information that is considered private. In this embodiment, the program 104 determines a rate of privacy for the received data based on a consensus of the public.

In step 406, the program 104 adjusts the received data. In this embodiment, the program 104 adjusts the received data by applying contextual factors to the received data, screening the received data in response to the application of contextual factors by identifying a specific factor, and removing outliers from the screened data by eliminating received data that does not demonstrate the identified specific factor. In this embodiment, the contextual factors are defined as sources of additional information associated with the received data. For example, contextual factors are results of the analysis of the received data by the training module and a user's shared history. In this embodiment, the program 104 adjusts the received data by selecting specific sub-sets of received data by identifying specific sub-sets of received data that demonstrate a predetermined factor. In this embodiment, the predetermined factors are defined a particular characteristic of data that can be used to provide additional information on the received data. In this embodiment, the program 104 dynamically adjusts the received data in response to identifying a change to at least one contextual factor in the plurality of contextual factors by removing outliers within the received data.

In step 408, the program 104 continually updates the analysis of the received data by using the information adjustment module. In this embodiment, the program 104 continually updates the received data by observing the screened data, receiving additional privacy information or objects that define user personalization via user input, and adding the received input and observations of the screened data to the analysis of the received input by the information adjustment module. In this embodiment, the program 104 compiles the addition of the received input and observations of the screened data in a generated database. For example, the program 104 observes two sub-sets of the received data are text data and photograph data, and the program 104 receives input from the user to distribute text data only. In response to observing the data and receiving the user input, the program 104 updates the analysis to prevent the sub-set of photograph data from being distributed.

In another embodiment, the program 104 updates the received data according to implementing historical data shared by multiple users in addition to the received user input and observations of the screened data. In this embodiment, the program 104 adjusts a privacy level associated with a sub-set of the received data by utilizing the following formula:

$$B(\text{level } n+Ə) \tag{3}$$

With respect to equation 3, "Ə" represents the screened data and "B" represents the element of the single (G/NB) that reflects the ratio of positive impact components and negative impact components. In this embodiment, the program 104 adjusts the privacy impact of a specific sub-set of received data based on the application of equation (3) to the received input. For example, the program 104 may modify a sub-set of received data that initially was placed in a bad rate within the personal information to a no impact rate of privacy or good rate of privacy in response to the information produced from the application of equation (3).

Figure 5:
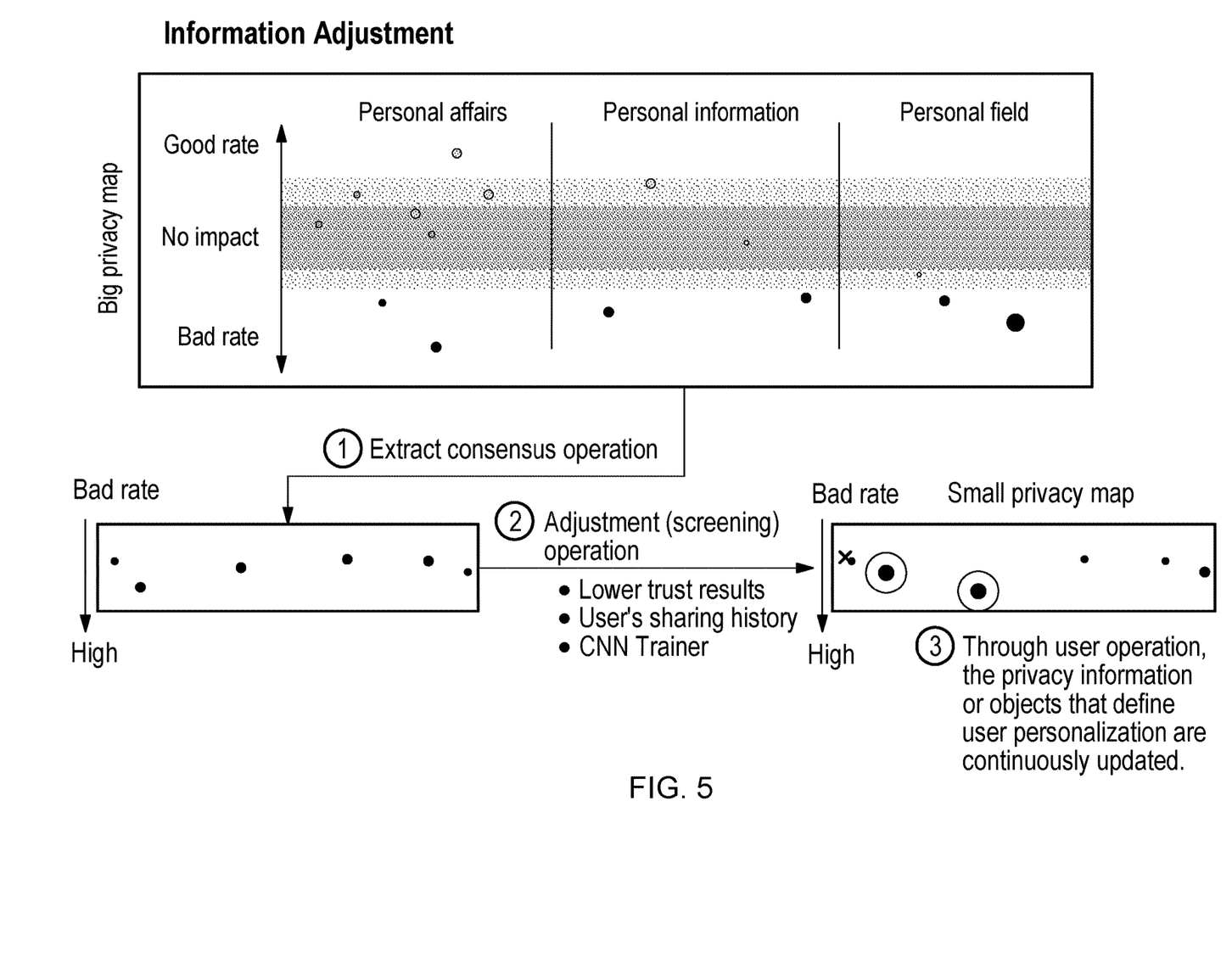
FIG. 5 is an exemplary diagram illustrating the result of the analysis of the received data using the information adjustment module.

FIG. 5 is an exemplary diagram of the program 104 analyzing the received data using the information adjustment module, in accordance with at least one embodiment.

In this embodiment, the program 104 identifies the dimension of privacy and places sub-sets of the received data in each respective dimension of privacy that the sub-set is associated with. For example, the program 104 places datapoints within the personal affairs dimension, the personal information dimension, and the personal field dimension. In this embodiment, the program 104 determines the rate of privacy based on the public influence of privacy. For example, the program 104 determines that a sub-set of received data has a good rate; the program 104 does not prevent distribution of the that sub-set of received input because when compared to the public's influence of privacy, the good rated received input does not contain private information. In this embodiment, the program 104 identifies three categories of rate of privacy, and these rates are good rate, which the program 104 does not need to prevent distribution, bad rates, which the program 104 automatically prevents distribution, and no impact, which the program 104 retrieves additional information to determine whether distribution is allowed.

Figure 6:
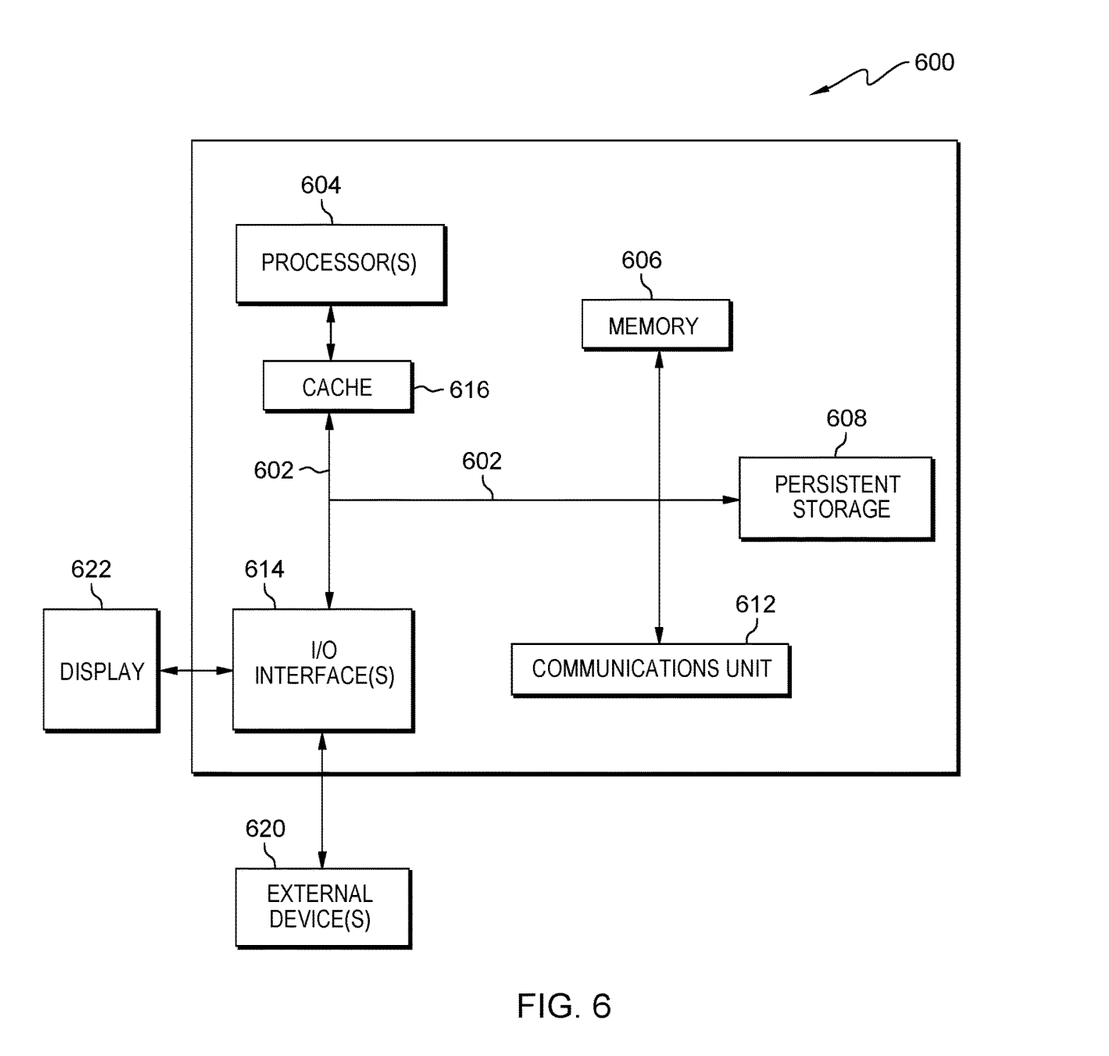
FIG. 6 depicts a block diagram of components of computing systems within a computing display environment of FIG. 1, in accordance with an embodiment of the present invention.

FIG. 6 depicts a block diagram of components of computing systems within a computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 600 includes a communications fabric 602, which provides communications between a cache 616, a memory 606, a persistent storage 608, a communications unit 612, a display 622 and an input/output (I/O) interface(s) 614. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses or a crossbar switch.

The memory 606 and the persistent storage 608 are computer readable storage media. In this embodiment, the memory 606 includes random access memory (RAM). In general, the memory 606 can include any suitable volatile or non-volatile computer readable storage media. The cache 616 is a fast memory that enhances the performance of the computer processor(s) 604 by holding recently accessed data, and data near accessed data, from the memory 606.

The program 104 may be stored in the persistent storage 608 and in the memory 606 for execution by one or more of the respective computer processors 604 via the cache 616. In an embodiment, the persistent storage 608 includes a magnetic hard disk drive. Alternatively, or in addition to a magnetic hard disk drive, the persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 608 may also be removable. For example, a removable hard drive may be used for the persistent storage 608. Other examples include optical and magnetic disks, thumb drives, and smart cards that are inserted into a drive for transfer onto another computer readable storage medium that is also part of the persistent storage 608.

The communications unit 612, in these examples, provides for communications with other data processing systems or devices. In these examples, the communications unit 612 includes one or more network interface cards. The communications unit 612 may provide communications through the use of either or both physical and wireless communications links. The program 104 may be downloaded to the persistent storage 608 through the communications unit 612.

The I/O interface(s) 614 allows for input and output of data with other devices that may be connected to a mobile device, an approval device, and/or the server computing device 108. For example, the I/O interface 614 may provide a connection to external devices 620 such as a keyboard, keypad, a touch screen, and/or some other suitable input device. External devices 620 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 608 via the I/O interface(s) 614. The I/O interface(s) 614 also connect to a display 622.

The display 622 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
identifying privacy data within received data by identifying markers that are indicative of privacy data within the received data;

generating a respective classification of an object within the identified privacy data;

assigning values to the generated respective classification of the object based on a perceived threat level associated with the identified privacy data; and in response to determining that the assigned value of the received data triggers an alert associated with a predetermined threshold for privacy, automatically preventing distribution of the received data from a computing device to another computing device.

2. The computer-implemented method of claim 1, wherein automatically preventing distribution of the received data comprises:

identifying markers that are indicative of privacy data within the received data and at least one security feature in a plurality of security features associated with the user, wherein the security feature specifies privacy expectations of the user;

actively monitoring transmissions of the computing device associated with an identified privacy data within the received data;

in response to selecting an object that includes the identified markers and the at least one security feature, automatically preventing distribution of the identified privacy data within the received data to another computing device; and transmitting a notification to the computing device detailing the prevention of distribution of the privacy data.

3. The computer-implemented method of claim 1, wherein identifying privacy data comprises:

identifying privacy data within the received data; and placing sub-sets of privacy data within the received data associated with the plurality of identified factors into ascending levels of privacy based on the analysis of the received data using the plurality of modules.

4. The computer-implemented method of claim 3, further comprising predicting an action of a placed sub-set of data within the received data by:

identifying a grouped subject based on the plurality of identified factors;

retrieving additional information associated with the identified grouped subject and extracted details from a server computing device; and determining the action associated with the grouped subject based on the identification and retrieval of additional information associated with the grouped subject.

5. The computer-implemented method of claim 1, further comprising analyzing received data using at least one module in a plurality of modules by:

predicting an action of an identified group within the received data using a training module; and dynamically adjusting the received data in response to identifying a change to at least one contextual factor in the plurality of contextual factors by removing outliers within the received data.

6. The computer-implemented method of claim 5, further comprising:

narrowing an examination of the received data to a predetermined area of inquiry by examining data with a predetermined rate of privacy; and in response to removing received data that exceeds the predetermined rate of privacy, adjusting the received data based on the narrowed examination of the received data.

7. The computer-implementing method of claim 6, wherein adjusting the received by:

applying contextual factors to the received data;

screening the received data based on the applied contextual factors by identifying at least one specific factor in a plurality of specific factors within the received data; and removing outliers from the screened data by eliminating received data that does not demonstrate the at least one identified specific factor.

8. A computer program product comprising:

one or more computer readable storage media and program instructions stored on the one or more computer readable storage media, the program instructions comprising:

program instructions to identify privacy data within received data by identifying markers that are indicative of privacy data within the received data;

program instructions to generate a respective classification of an object within the identified privacy data;

program instructions to assign values to the generated respective classification of the object based on a perceived threat level associated with the identified privacy data; and in response to determining that the assigned value of the received data triggers an alert associated with a predetermined threshold for privacy, program instructions to automatically prevent distribution of the received data from a computing device to another computing device.

9. The computer program product of claim 8, wherein the program instructions to automatically prevent distribution of the received data from a computing device to another computing device comprise:

program instructions to identify markers that are indicative of privacy data within the received data and at least one security feature in a plurality of security features associated with the user, wherein the security feature specifies privacy expectations of the user;

program instructions to actively monitor transmissions of the computing device associated with an identified privacy data within the received data;

in response to selecting an object that includes the identified markers and the at least one security feature, program instructions to automatically prevent distribution of the identified privacy data within the received data to another computing device; and program instructions to transmit a notification to the computing device detailing the prevention of distribution of the privacy data.

10. The computer program product of claim 8, wherein the program instructions to identify privacy data comprise:

program instructions to identify privacy data within the received data; and program instructions to place sub-sets of privacy data within the received data associated with the plurality of identified factors into ascending levels of privacy based on the analysis of the received data using a plurality of modules.

11. The computer program product of claim 10, wherein the program instructions stored on the one or more computer readable storage media further comprise:

program instructions to predict an action of a placed sub-set of data within the received data by:

program instructions to identify a grouped subject based on the plurality of identified factors;

program instructions to retrieve additional information associated with the identified grouped subject and extracted details from a server computing device; and program instructions to determine the action associated with the grouped subject based on the identification and retrieval of additional information associated with the grouped subject.

12. The computer program product of claim 8, wherein the program instructions stored on the one or more computer readable storage media further comprise:
   program instructions to analyze received data using at least one module in a plurality of modules by:
      program instructions to predict an action of an identified group within the received data using a training module; and
      program instructions to dynamically adjust the received data in response to identifying a change to at least one contextual factor in the plurality of contextual factors by removing outliers within the received data.

13. The computer program product of claim 12, wherein the program instructions stored on the one or more computer readable storage media further comprise:
   program instructions to narrow an examination of the received data to a predetermined area of inquiry by examining data with a predetermined rate of privacy; and
   in response to removing received data that exceeds the predetermined rate of privacy, program instructions to adjust the received data based on the narrowed examination of the received data.

14. The computer program product of claim 13, wherein the program instructions to adjust the received data based on the narrowed examination of the received data comprise:
   program instructions to apply contextual factors to the received data;
   program instructions to screen the received data based on the applied contextual factors by identifying at least one specific factor in a plurality of specific factors within the received data; and
   program instructions to remove outliers from the screened data by eliminating received data that does not demonstrate the at least one identified specific factor.

15. A computer system comprising:
   one or more computer processors;
   one or more computer readable storage media; and
   program instructions stored on the one or more computer readable storage media for execution by at least one of the one or more processors, the program instructions comprising:
      program instructions to identify privacy data within received data by identifying markers that are indicative of privacy data within the received data;
      program instructions to generate a respective classification of an object within the identified privacy data;
      program instructions to assign values to the generated respective classification of the object based on a perceived threat level associated with the identified privacy data; and
      in response to determining that the assigned value of the received data triggers an alert associated with a predetermined threshold for privacy, program instructions to automatically prevent distribution of the received data from a computing device to another computing device.

16. The computer system of claim 15, wherein the program instructions to automatically prevent distribution of the received data from a computing device to another computing device comprise:
   program instructions to identify markers that are indicative of privacy data within the received data and at least one security feature in a plurality of security features associated with the user, wherein the security feature specifies privacy expectations of the user;
   program instructions to actively monitor transmissions of the computing device associated with an identified privacy data within the received data;
   in response to selecting an object that includes the identified markers and the at least one security feature, program instructions to automatically prevent distribution of the identified privacy data within the received data to another computing device; and
   program instructions to transmit a notification to the computing device detailing the prevention of distribution of the privacy data.

17. The computer system of claim 15, wherein the program instructions to identify privacy data comprise:
   program instructions to identify privacy data within the received data; and
   program instructions to place sub-sets of privacy data within the received data associated with the plurality of identified factors into ascending levels of privacy based on the analysis of the received data using a plurality of modules.

18. The computer system of claim 17, wherein the program instructions stored on the one or more computer readable storage media further comprise:
   program instructions to predict an action of a placed sub-set of data within the received data by:
      program instructions to identify a grouped subject based on the plurality of identified factors;
      program instructions to retrieve additional information associated with the identified grouped subject and extracted details from a server computing device; and
      program instructions to determine the action associated with the grouped subject based on the identification and retrieval of additional information associated with the grouped subject.

19. The computer system of claim 15, wherein the program instructions stored on the one or more computer readable storage media further comprise:
   program instructions to analyze received data using at least one module in a plurality of modules by:
      program instructions to predict an action of an identified group within the received data using a training module; and
      program instructions to dynamically adjust the received data in response to identifying a change to at least one contextual factor in the plurality of contextual factors by removing outliers within the received data.

20. The computer system of claim 19, wherein the program instructions stored on the one or more computer readable storage media further comprise:
   program instructions to narrow an examination of the received data to a predetermined area of inquiry by examining data with a predetermined rate of privacy; and
   in response to removing received data that exceeds the predetermined rate of privacy, program instructions to adjust the received data based on the narrowed examination of the received data.

* * * * *